United States Patent [19]

Goiny

[11] Patent Number: 4,969,788
[45] Date of Patent: Nov. 13, 1990

[54] NUT WITH PRESSURE RING

[75] Inventor: Lothar Goiny, Hausch, Fed. Rep. of Germany

[73] Assignee: Erich Neumayer Beteiligungs-Und Verwaltungsgesellschaft mbH & Co. KG, Hausach, Fed. Rep. of Germany

[21] Appl. No.: 427,244

[22] Filed: Oct. 25, 1989

[30] Foreign Application Priority Data

Oct. 27, 1988 [DE] Fed. Rep. of Germany ... 8813513[U]

[51] Int. Cl.$^5$ .............................................. F16B 37/00
[52] U.S. Cl. .................................... 411/428; 411/432; 411/533
[58] Field of Search ............... 411/428, 432, 533, 368, 411/369, 148, 237; 301/9 DN

[56] References Cited

U.S. PATENT DOCUMENTS

| | | | |
|---|---|---|---|
| 2,597,835 | 5/1952 | Eksergian | 301/9 DN |
| 3,386,771 | 6/1968 | Verdier et al. | 411/533 |
| 3,742,808 | 7/1973 | Trembley | 411/432 |
| 4,790,703 | 12/1988 | Wing | 411/533 |

FOREIGN PATENT DOCUMENTS 672538 10/1963 Canada .................................. 411/428

Primary Examiner—Neill R. Wilson

[57] ABSTRACT

The invention relates to a nut with a pressure ring in which the pressure ring is provided with a spherically shaped underside for engagement with a depression complementary thereto in a component to be secured. In order to permit a simple and secure mounting of the nut with the pressure ring and to guarantee a clearly reproducible holddown force, the pressure ring (12) is formed as a closed ring and means (18, 19), such as for example a peripheral rim and a circumferential flange, are provided for connecting the nut (10) with the pressure ring (12) which prevents a separation and loss. Thereby the nut and ring are rotatable relative to one another about a nut axis (1) and are shiftable relative to one another transversely of the nut axis (1). The peripheral rim (18) for connecting the nut (10) and the pressure ring (12) is so arranged on the first of these two elements that it engages in overlapping relationship the circumferential flange (19) on the second element (12) with radial and axial freeplay.

11 Claims, 3 Drawing Sheets

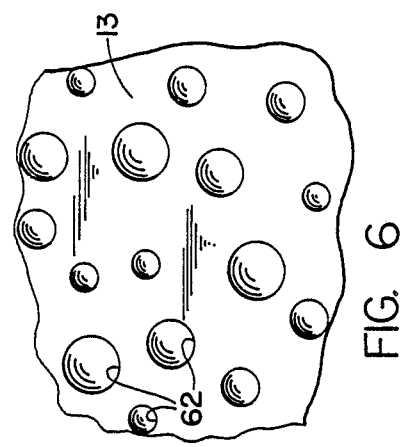

NUT WITH PRESSURE RING

The invention relates to a nut with a pressure ring of the type in which the pressure ring has a spherically shaped undersurface for engagement with a complementary shaped depression in the component to be secured.

With these types of devices the load of the nut screwed onto a threaded bolt is transferred by means of the pressure ring to a component to be secured. The spherical or calotte-shaped underside of the pressure ring cooperating with the depression of the component to be secured guarantees a large surface area of the ring against the component, especially if the bolt axis is tipped over, that is, departs from an expected disposition.

It is already well known that to employ as a pressure ring, a slit ring that is disconnected from the nut (DIN 74361 Part 1). In the region of the slit the upper, pressure transmitting surface disposed at a position adjacent the nut as well as the spherical underside of the pressure ring have a break which is bounded by relatively sharp edges. Furthermore, if the slit according to the above-mentioned DIN-instructions is formed as a angularly disposed slit, one of the material edges at each end of the slit is acutely angled, that is, formed with a somewhat wedged-shape. These edges under high screw loads applied by the nut project toward the respective oppositely disposed surfaces, that is, the pressure transfer surfaces of the nut or correspondingly, the spherical depressions of the component to be secured, and start to damage these surfaces. Thereby the torques for turning the nut down are increased so that under some circumstances the largest permitted torque, limited for example by means of an adjustable torque wrench, is reached before the necessary bolt tensioning torque is reached. With this there is also coupled the danger that the self-locking torque securing the nut to the bolt is not achieved so that the bolt can loosen with fluctuating loads.

A further disadvantage of the known solution also arises when the pressure ring is a separate component from the nut. Because of this, on the one hand, assembly is made more difficult since the mechanic before screwing the nut on the bolt must place the pressure ring on the bolt. Besides there exists a danger that the mechanic will either not install the correct pressure ring or install no pressure ring at all. In both instances there is an imperfect or defective fastening. Besides there also exists the danger that this type of pressure ring will be lost so that in the course of repairs performed outside of a well organized workshop, the proper mounting is made more difficult or impossible.

Besides with the slit pressure ring there is always the danger that with an imperfectly matched slit width the pressure ring will neck down around the bolt before the slit closes so that the pressure ring will be captured on the bolt axially and radially and its pressure-transfer function can no longer be obtained. Further no adjustment of the positioning error of the bores (16) can be produced relative to one another. With conical or conically joined nuts a positioning error of several bores relative to one another cannot be accommodated without adding bending stresses to the bolt.

It is an object in the present invention to provide a nut with a pressure ring of the type in which the pressure ring has a spherically shaped undersurface for engagement with a complementary shaped depression in the component to be secured, which permits a simple and secure mounting whereby, in particular, known, reproducible holddown forces are guaranteed.

This object is achieved according to the present invention by means which establish a connection between the nut and pressure ring and at the same time allow relative rotation and lateral shifting of the nut and pressure ring relative to one another.

The pressure ring is formed as a closed ring. In this manner sharp material edges are eliminated which could destroy the pressure transmitting surfaces. Additionally according to the present invention at least one of the pressure transmitting surfaces of the nut or the pressure ring which face one another is patterned, that is, it is provided with small pockets for a lubricant. On the patterned pressure transmitting surface a lubricating film can be applied which remains permanently effective. In contrast to this the material edges of a slit pressure ring according to the above-mentioned DIN-specification or the damage originating from the material edges destroy each lubricating film on the pressure transmitting surfaces of the bolt and strip the films from the surfaces. If however an effective lubricating film is available between the pressure transmitting surfaces, then essentially no portion of the holddown torque is lost due to friction between these surfaces and the entire holddown torque is available for producing a known, predeterminable and reproducible bolt tension.

The pressure ring according to one embodiment of the invention is securely connected with the nut to prevent loss; since the pressure ring always retains its shape and size, even under great loads, the means for connecting the pressure ring with the nut can be very simply formed, that is, a looseness of the pressure ring on the nut on the one hand or a tight seating of the pressure ring on the nut on the other hand as a consequence of variations in the diameter of the pressure ring is not to be feared.

The means for connecting the nut and the pressure ring according to one embodiment of the invention is formed by means of a peripheral rim arranged on a first of these two elements, which engages a circumferential flange arranged correspondingly on a second of the two elements with radial and axial freeplay. The peripheral rim and the radial flange can be positioned correspondingly on the inner circumference or also on the outer circumference of the two elements as will be further described with the aid of an exemplary embodiment. Besides this there is a peripheral rim arranged correspondingly on the element which is composed of the softer material. In a preferred embodiment the pressure ring is made of the very hard material, and the nut is formed of the soft material so that the peripheral rim is preferably provided on the nut.

With another embodiment of the invention the means for connecting the nut and the pressure ring are formed by means of a special clamping ring which engages a circumferential flange formed on each of the two elements. Since the clamping ring is not connected directly as a unit with one of the two elements, these elements can accordingly be manufactured out of a material which is most favorable for them and independent of the requirement of being deformable.

In order to avoid chattering of the clamping ring, it is provided in accordance with the present invention that this clamping ring is actually centered on one of the two elements without freeplay and correspondingly it surrounds the other element with the required lateral play.

In a further embodiment of the invention it is provided that the pressure ring has an inside diameter which is larger by a predetermined tolerance than the diameter of the bolt threads. This tolerance allows an eccentric displacement of the pressure ring relative to the nut and bolt and with this an adjustment of the lateral offset between the bolt and the bolt hole of the parts to be fastened as a result of finish imperfections. With conical and conically joined nuts this adjustment is not possible.

The adjacent pressure transmitting surfaces of the nut and the pressure ring are preferably disposed at right angles to the nut axis.

Several exemplary embodiments are illustrated in the drawings and are further described below. The drawings are as follows:

FIG. 6 is an enlarged, fragmentary view of a pressure transmitting surface between the nut and pressure ring with pockets for a lubricant.

The respective figures illustrate a first component 2 to which a threaded bolt 4 is fastened in a desired manner which is not illustrated further. A second component 6 is to be bolted to the first component by means of a nut with a pressure ring.

Figure 1:
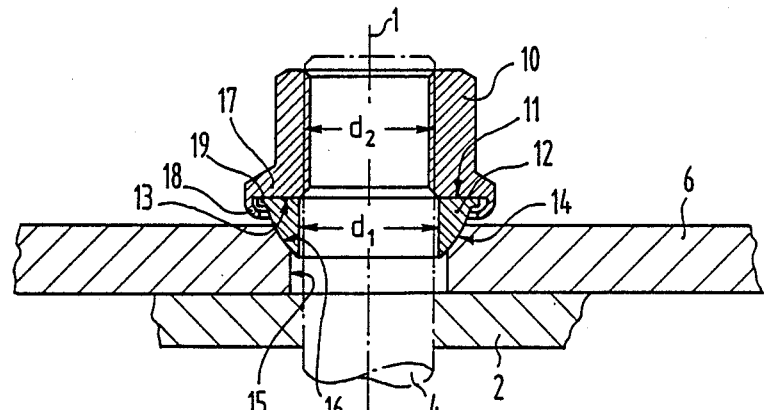
FIG. 1 shows a nut with pressure ring in which a peripheral rim is located on the outer circumference of the nut.

FIG. 1 illustrates a nut 10 which is threadable onto the bolt 4 as well as a pressure ring 12 which transmits the forces generated by the nut 10 onto the component 6. The pressure ring 12 consists of a spherically shaped underside 14 which engages a depression 16 complementary thereto and circumscribing the through-opening 15 for the threaded bolt 4. The nut 10 is provided with a circumferential flange 17 which continues in the axial direction into the peripheral rim 18. The peripheral rim 18 is crimped over a circumferential flange 19 formed on the pressure ring 12.

As observed in FIG. 1, the peripheral rim 18 is crimped over the circumferential flange 18 with axial and radial free play. This guarantees that the nut 10 and the pressure ring 12 are rotatable relative to one another and are shiftable transversely of the nut axis 1. Besides the pressure ring 12 has an inside $d_1$ which is larger by a predetermined tolerance than the thread $d_2$ of the nut. The radial play between the peripheral rim 18 and the circumferential flange 19 on the one hand and the difference between the diameters $d_1$ and $d_2$ on the other hand make possible an eccentric shifting of the pressure ring 12 relative to the nut 10 if, for example due to finish imperfections, the hole 15 and the depression 16 are positioned in a radially offset relationship relative to the threaded bolt 4. The spherically shaped configuration of the lower side 14 of the pressure ring 12 on the one hand and the depression 16 on the other hand additionally make possible an accommodation of the tilting of the threaded bolt 4 relative to the component 6 to be secured.

Figure 2:
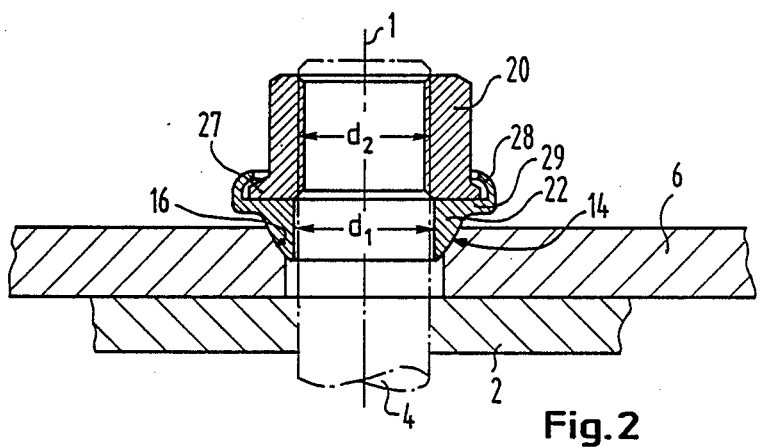
FIG. 2 illustrates a nut with a pressure ring in which a peripheral rim is located on the outer circumference of the pressure ring.

FIG. 2 illustrates a nut 20 with a pressure ring 22. A peripheral rim 28 is connected as a unit with a circumferential flange 29 of the pressure ring 22. The peripheral rim 28 is crimped over a circumferential flange 28 formed on the nut 20 with axial and radial free play so that the pressure ring 22 is connected with the nut 20 without the chance of being lost. On the other hand however, rotation of the pressure ring 22 about the axis of the nut 1 as well as shifting laterally of the nut axis 1 are possible.

The configuration of the spherically shaped underside 14 and the depression 16 of the component 6 complementary thereto as well as a difference of inside diameters $d_1$ and $d_2$ correspond to the configuration already described with the aid of FIG. 1 so that these matters are not further described again.

Figure 3:
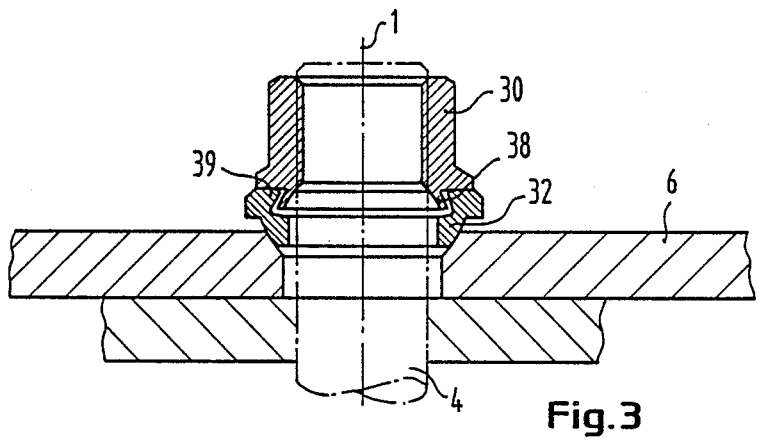
FIG. 3 illustrates a nut with a pressure ring in which a peripheral rim is located on the inner circumference of the nut.

FIG. 3 illustrates an exemplary embodiment in which a peripheral rim 38 is arranged or located on the nut 30, and the rim is in overlapping engagement with an inwardly projecting circumferential flange 39 formed on the inner circumference of the pressure ring 32. Also in this embodiment an axial and radial freeplay is again provided between the peripheral rim 38 and the circumferential flange 29 so that the pressure ring can be rotated about the nut axis 1 and shifted laterally thereto.

Figure 4:
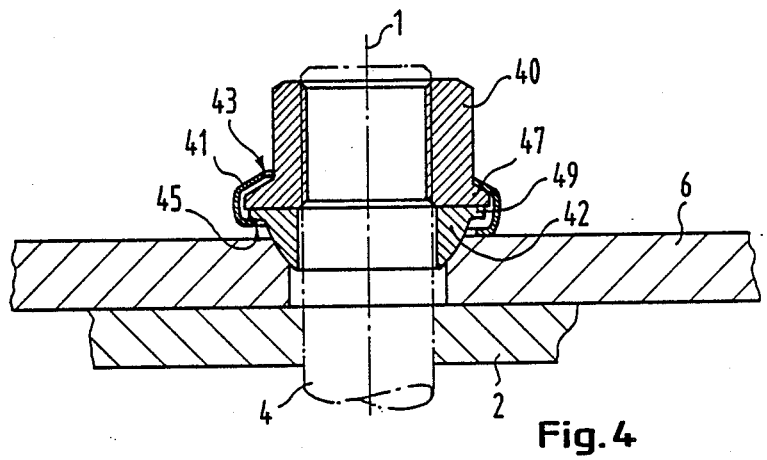
FIG. 4 is a nut with a pressure ring and a special nut-centering clamping ring.

FIG. 4 illustrates an embodiment in which the nut 40 having a circumferential flange 47 and the pressure ring 42 provided with a circumferential flange 49 are interconnected with one another without a chance of loss by means of a clamping ring in overlapping engagement with both circumferential flanges 47, 49. The clamping ring 41 has two inwardly turned edges 43, 45. In the embodiment illustrated in FIG. 4 the edge 43 disposed on the nut 40 surrounds the nut essentially without freeplay as illustrated on the right in FIG. 4. The edge 45 disposed on the pressure ring 42 surrounds this nut with radial freeplay so that a shifting of a pressure ring 42 laterally of the nut axis 1 is possible. Besides the axial distance of the edges 43 and 45 is so dimensioned that the pressure ring 42 and the nut 40 also remain movable relative to one another in the axial direction. The clearance between the clamping ring 41 and the nut 40 can be so dimensioned that the clamping ring is frictionally fitted on the nut 40 and is therefore clatterfree.

Figure 5:
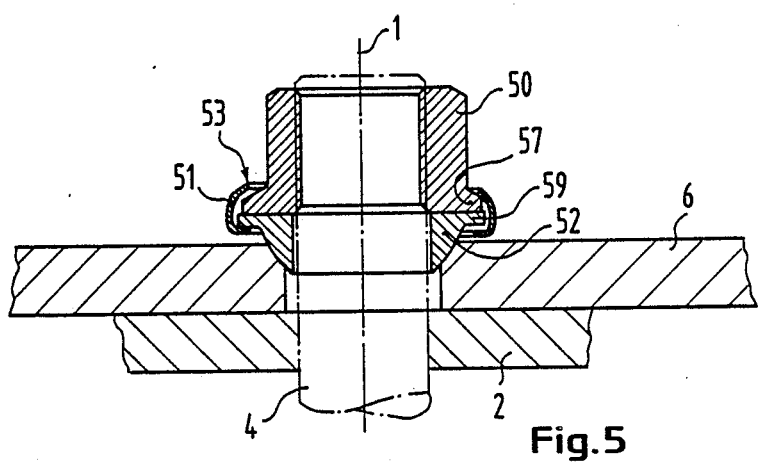
FIG. 5 illustrates a nut with a pressure ring and a special clamping ring for centering the pressure ring.

FIG. 5 illustrates an example similar to the embodiment illustrated in FIG. 4. The nut 50 and the pressure ring 52 are interconnected with one another by means of a clamping ring 51 so that they cannot be separated and lost. The clamping ring 51 engages on the one hand a circumferential flange 57 formed on the nut 50 and on the other hand a circumferential flange 59 formed on the pressure ring 52. The circumferential flange 59 has a larger diameter than the flange 57; clamping ring 51 is so dimensioned that it lies against the circumferential flange 59 with essentially no freeplay in the radial direction and as a result is centered on the pressure ring 52. The upper edge 52 facing the nut 50 surrounds the nut 50 with radial play so that a movement of the pressure ring 52 relative to the nut is possible transversely of the nut axis 1.

In all of the exemplary embodiments the circumferential flange of the nut and the pressure ring are formed on the ends of the elements facing one another and directly establish the pressure transmitting surfaces. In this manner the pressure transfer surfaces are relatively large whereby minimal surface pressure results.

As was already further described above a respective pressure transmitting surface, preferably the pressure transmitting surface 13 of the nut 10, is provided in a known manner with lubricant pockets or recesses 62 as shown in FIG. 6. This can be achieved for example by shot peening the pressure transmitting surface 13. In this manner the pressure transmitting surface 13 can be provided with a permanent lubricating film whereby friction between the nut and the pressure ring can be kept as small as possible and a debasing of the holddown torque during tightening of the bolt is avoided.

The pressure transmitting surface 11 of the pressure ring which cooperates with the pressure transmitting surface 13 is for example finely turned or polished.

An equally favorable match is achieved if the parts are reversed and the pressure transmitting surface 11 is shot peened and the pressure transmitting surface 13 is finely turned or polished.

I claim:

1. A nut with a pressure ring, the pressure ring having a spherically shaped under surface for engagement with a depression complementary therewith in a component to be secured, characterized in that the pressure ring is a closed ring; means are provided for establishing a connection of the nut with the pressure ring to prevent separation and loss, and permit the nut and ring to rotate relative to one another about the nut axis and shift relative to one another laterally of the nut axis; and the nut and the pressure ring have confronting pressure-transmitting surfaces for transmitting pressure between the two surfaces upon tightening the nut on a bolt, one of the pressure-transmitting surfaces being shot peened to provide lubrication pockets, and the other of the pressure transmitting surfaces being finely turned.

2. A nut with a pressure ring according to claim 1 characterized in that the means for connecting the nut and the pressure ring are actually formed by a peripheral rim disposed on a first of these two elements, which rim is in overlapping relationship with a circumferential flange disposed on a second element respectively.

3. A nut with a pressure ring according to claim 2 characterized in that the peripheral rim is a continuation of a circumferential flange formed on the respective first element.

4. A nut with a pressure ring according to claim 3 characterized in that the circumferential flanges of the nut and the pressure ring are formed actually on the ends of these two elements facing one another and comprise the pressure transmitting surfaces (11, 13).

5. A nut with a pressure ring, the pressure ring having a spherically shaped under surface for engagement with a depression complementary therewith in a component to be secured, characterized in that the pressure ring is a closed ring; and means are provided for establishing a connection of the nut with the pressure ring to prevent separation and loss, and permit the nut and ring to rotate relative to one another about the nut axis and shift relative to one another laterally of the nut axis, the nut and the pressure ring each having a projecting circumferential flange, and the means establishing a connection including a clamping ring engaging each of the circumferential flanges in overlapping relationship.

6. A nut with a pressure ring according to claim 1 characterized in that a clamping ring is centered without freeplay on one of the two elements and surrounds the other element with lateral freeplay.

7. A nut with a pressure ring according to claim 1 characterized in that the clamping ring consists of spring steel.

8. A nut with a pressure ring according to claim 1 characterized in that the pressure ring has an inside diameter which is larger than the thread diameter of the nut by a predetermined tolerance.

9. A nut with a pressure ring according to claim 1 characterized in that the pressure transmitting surfaces of the two elements are disposed at right angles to the nut axis.

10. A nut with a pressure ring according to claim 1 characterized in that the spherically shaped underside of the pressure ring comprises a calotte lying on the nut axis.

11. A nut with a pressure ring, the pressure ring having a spherically shaped under surface for engagement with a depression complementary therewith in a component to be secured, characterized in that the pressure ring is a closed ring; means are provided for establishing a connection of the nut with the pressure ring to prevent separation and loss, and permit the nut and ring to rotate relative to one another about the nut axis and shift relative to one another laterally of the nut axis; and the nut and the pressure ring have confronting pressure transmitting surfaces, at least one of the pressure-transmitting surfaces being provided with a plurality of recesses for holding a lubricant.

* * * * *